US012712573B2

(12) United States Patent
Mondal

(10) Patent No.: US 12,712,573 B2
(45) Date of Patent: Aug. 18, 2026

(54) METHOD AND SYSTEM FOR MANAGING RADIO FREQUENCY SIGNAL COUPLING

(71) Applicant: HFCL Limited, Bangalore (IN)

(72) Inventor: Subhas Chandra Mondal, Bangalore (IN)

(73) Assignee: HFCL Limited, Bangalore (IN)

( * ) Notice: Subject to any disclaimer, the term of this patent is extended or adjusted under 35 U.S.C. 154(b) by 292 days.

(21) Appl. No.: 18/440,400

(22) Filed: Feb. 13, 2024

(65) Prior Publication Data

US 2024/0275414 A1 Aug. 15, 2024

(30) Foreign Application Priority Data

Feb. 14, 2023 (IN) ............................ 202341009816

(51) Int. Cl.
*H04B 1/00* (2006.01)
*H04B 1/04* (2006.01)

(52) U.S. Cl.
CPC ......... *H04B 1/0078* (2013.01); *H04B 1/0458* (2013.01); *H04B 2001/0408* (2013.01)

(58) Field of Classification Search
CPC ................ H04B 1/0078; H04B 1/0458; H02B 2001/0408
See application file for complete search history.

(56) References Cited

U.S. PATENT DOCUMENTS 11,139,845 B2 10/2021 Luo et al.
2011/0274210 A1* 11/2011 Chekhovstov ........ H03F 1/3247 375/297
2020/0099347 A1* 3/2020 Andrey ................ H04L 27/367
2025/0211411 A1* 6/2025 Cai .......................... H04L 5/14

OTHER PUBLICATIONS

Nopchinda, D., Buisman, K. (2018). Measurement Technique to Emulate Signal Coupling Between Power Amplifiers. IEEE Transactions on Microwave Theory and Techniques, 66(4): 2034-2046. http://dx.doi.org/10.1109/TMTT.2017.2786274.

Khed, Kishore (2018). RF BiST to detect IQ imbalances considering crosstalk effects for advanced antenna system. [Master's thesis, Lund University]. Available online: [(https://www.eit.lth.se/sprapport.php?uid=1143)].

* cited by examiner

*Primary Examiner* — Janice N Tieu

(74) *Attorney, Agent, or Firm* — The Roy Gross Law Firm, LLC; Roy D. Gross

(57) ABSTRACT

Approaches for managing radio frequency signal coupling are described. An apparatus may include a baseband processor with a plurality of transceiver chains including a plurality of transmit chains. Each of the plurality of transmit chains includes a power amplifier configured to receive an input signal from the baseband processor and amplify the input signal to generate an output signal having an output power. The transmit chain includes a coupler configured to generate a feedback signal based on the output signal. Based on a reference signal, the baseband processor identifies a set of coupling coefficients for each of the plurality of transmit chains, and pre-process the input signal to generate a modified input signal to be transmitted via each of the plurality of transmit chains such that the modified input signal nullifies signal impairment due to radio frequency signal coupling between any two transmit chains in the plurality of transmit chains.

19 Claims, 8 Drawing Sheets

METHOD AND SYSTEM FOR MANAGING RADIO FREQUENCY SIGNAL COUPLING

CROSS REFERENCE TO RELATED APPLICATIONS

This application claims the benefit of priority of Indian Patent Application No. 202341009816, filed Feb. 14, 2023, the contents of which are all incorporated herein by reference in their entirety.

TECHNICAL FIELD

The present disclosure, in general, relates to managing radio frequency signal coupling, and in particular, relates to method and system for eliminating the impact of signal coupling on the performance of a multi-antenna transceiver system, for example, a fifth generation (5G) radio transceiver system, using baseband signal processing techniques.

BACKGROUND

The following description of the related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of the prior art.

A wireless radio channel suffers from high attenuation as the distance between the transmitter and receiver increases. The attenuation is higher at higher frequencies. To increase the inter-site distance of the base stations (BS), the transmit signal strength is boosted with a high-power amplifier (PA) to withstand the high attenuation.

In the fifth generation (5G) new radio (NR) technology, the BS transmits high power RF (Radio Frequency) signal to fulfil the demand for high data rates and high quality of service (QoS). 5G Base station uses multi antenna transmitters and receivers to offer MIMO (Multi Input Multi Output) functionalities to increase the overall system performance in terms of coverage and capacity. 5G NR uses multi-carrier modulation scheme such as orthogonal frequency division multiplexing (OFDM), which is susceptible to non-linear distortion due to its high peak to average power ratio (PAPR). In a multi transceiver, multi-antenna system, it is possible that one transmit-chain is at peak power state while the adjacent transmit chain is at the lower power state.

Due to physical proximity of the electronic circuits to realize the multi transmitter system, there could be electrical coupling amongst the RF signals passing through different transmit chains. This introduces severe signal impairment that affects system performance more severely than the random noise. This is because the pre-coded MIMO data streams for each antenna is mathematically related and hence the coupling could impact the impairment that could affect the orthogonality of the signals, which is the fundamental principle of operation for successful decoding of the signal. The issue would be more severe when the MIMO streams are beamformed as the beams will be prone to be malformed when the signals are impaired.

There are methods and systems known in the art to provide isolation amongst the transmit/receive chains with specialized hardware circuits. However, with massive MIMO, the number of RF chains increase substantially and hence the hardware-based isolation puts severe constraint on routing. In addition, the signal traces may run close to each other in some instances despite utmost care since the implementation complexity of the system grows beyond acceptable limit.

There is, therefore, a need in the art to provide systems and methods that can overcome the shortcomings of the current mechanisms.

OBJECTS OF THE PRESENT DISCLOSURE

Some of the objects of the present disclosure, which at least one embodiment herein satisfies are as listed herein below.

It is an object of the present disclosure to provide an efficient solution for managing radio coupling of a fifth generation (5G) transceiver.

It is another object of the present disclosure to nullify coupling effect while transmitting signal from a baseband in a transceiver.

SUMMARY

This section is provided to introduce certain objects and aspects of the present disclosure in a simplified form that are further described below in the detailed description. This summary is not intended to identify the key features or the scope of the claimed subject matter.

Embodiments of an apparatus for managing radio frequency signal coupling are disclosed. In an embodiment, the apparatus includes a baseband processor comprising a plurality of transceiver chains, wherein the plurality of transceiver chains comprises a plurality of transmit chains. Each of the plurality of transmit chains comprises a power amplifier communicatively coupled to the baseband processor, wherein the power amplifier is configured to receive a modified input signal from the baseband processor and amplify the modified input signal to generate an output signal having an output power. The modified input signal is generated based on a predetermined set of coupling coefficients. The baseband processor is configured to, based on a reference signal and at least one feedback signal, compute the predetermined set of coupling coefficients for each of the plurality of transmit chains. The baseband processor is configured to, based on the determined set of coupling coefficients, pre-process an input signal to generate the modified input signal to be transmitted via each of the plurality of transmit chains such that the modified input signal nullifies a signal impairment due to radio frequency signal coupling between any two transmit chains in the plurality of transmit chains.

In an embodiment, the baseband processor is configured to generate the reference signal with a periodicity based at least on communication band utilized for transmission of the input signal and a length of the plurality of transmit chains.

In an embodiment, the apparatus includes a coupler configured to generate the at least one feedback signal based on the reference signal.

In an embodiment, the apparatus includes a feedback selection unit configured to select, based on the reference signal, a first feedback signal corresponding to a given transmit chain and a second feedback signal corresponding to at least one other transmit chain of the plurality of transmit chains. In an embodiment, the apparatus further includes one or more registers in the baseband processor configured to store a feedback power corresponding to each of the first feedback signal and the second feedback signal. The baseband processor is configured to compute the feedback power of the feedback signal corresponding to each of the plurality of transmit chains.

In an embodiment, the baseband processor is configured to determine the coupling coefficient at the at least one other transmit chain while the given transmit chain transmits the reference signal, and wherein the coupling coefficient at the at least other transmit chain is determined based on a ratio of the feedback power of the second feedback signal and the feedback power of the first feedback signal.

In an embodiment, the reference signal has a predetermined periodicity. In an embodiment, the modified input signal is generated based on:

$$x_1' = x_1 - C21 * x2 - \ldots - Cn1 * xn,$$

wherein $x'_1$ is the modified input signal at a given transmit chain, $x_1$ is the input signal at the given transmit chain, C21 is coupling coefficient at the given transmit chain while at least one other transmit chain transmits the input signal, $x_2$ is the input signal at the at least one other transmit chain, Cn1 is the coupling coefficient at the given transmit chain while an $n^{th}$ transmit chain of the plurality of transmit chains transmits the input signal, and $x_n$ is the input signal at the $n^{th}$ transmit chain, wherein n corresponds to a number of the plurality of transmit chains.

In an embodiment, a method for managing radio frequency signal coupling. The method includes transmitting, by a baseband processor, in each of a plurality of transmit chains, a modified input signal to a power amplifier, wherein the modified input signal is generated based on a predetermined set of coupling coefficients. In an embodiment, the predetermined set of coupling coefficients are computed, for each of the plurality of transmit chains, by, selecting, by the baseband processor, a first feedback signal in a given transmit chain of the plurality of transmit chains and a second feedback signal in another transmit chain of the plurality of transmit chains, when a reference signal is transmitted via the given transmit chain, determining, by the baseband processor, a feedback power associated with each of the first feedback signal and the second feedback signal, and determining, by the baseband processor, a coupling coefficient at the another transmit chain while the given transmit chain transmits the reference signal, wherein the coupling coefficient at the another transmit chain is based on the feedback power associated with each of the first feedback signal and the second feedback signal respectively.

In an embodiment, the coupling coefficient at the another transmit chain corresponds to a ratio of the feedback power associated with the second feedback signal and the feedback power associated with the first feedback signal. In an embodiment, the another transmit chain corresponds to an adjacent transmit chain with respect to the given transmit chain. In an embodiment, the method includes generating, by the baseband processor, for each of the plurality of transmit chains, a modified input signal based on the respectively determined coupling coefficient to nullify a coupling signal corresponding to the coupling coefficient of the each of the plurality of transmit chains.

Embodiments of a system for managing radio frequency signal coupling are disclosed. In an embodiment, the system includes a processor and a memory coupled to the processor. The memory comprises processor-executable instructions that when executed by the processor causes the processor to, for each of the plurality of transmit chains, select a first feedback signal in a given transmit chain of the plurality of transmit chains and a second feedback signal in another transmit chain of the plurality of transmit chains based on a reference signal, determine a feedback power associated with each of the first feedback signal and the second feedback signal, and determine a coupling coefficient at the another transmit chain while the first transmit chain transmits the reference signal, wherein the coupling coefficient at the another transmit chain is based on the feedback power associated with each of the first feedback signal and the second feedback signal.

The memory comprises processor-executable instructions that when executed by the processor causes the processor to, for each of the plurality of transmit chains, identify a set of coupling coefficients for transmission of an input signal via each of the plurality of transmit chains, and generate a modified input signal to be transmitted via each of the plurality of transmit chains based on the identified set of coupling coefficients to nullify a coupling signal in each of the plurality of transmit chains. The coupling signal represents a signal impairment due to radio frequency signal coupling between any two transmit chains in the plurality of transmit chains.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1:
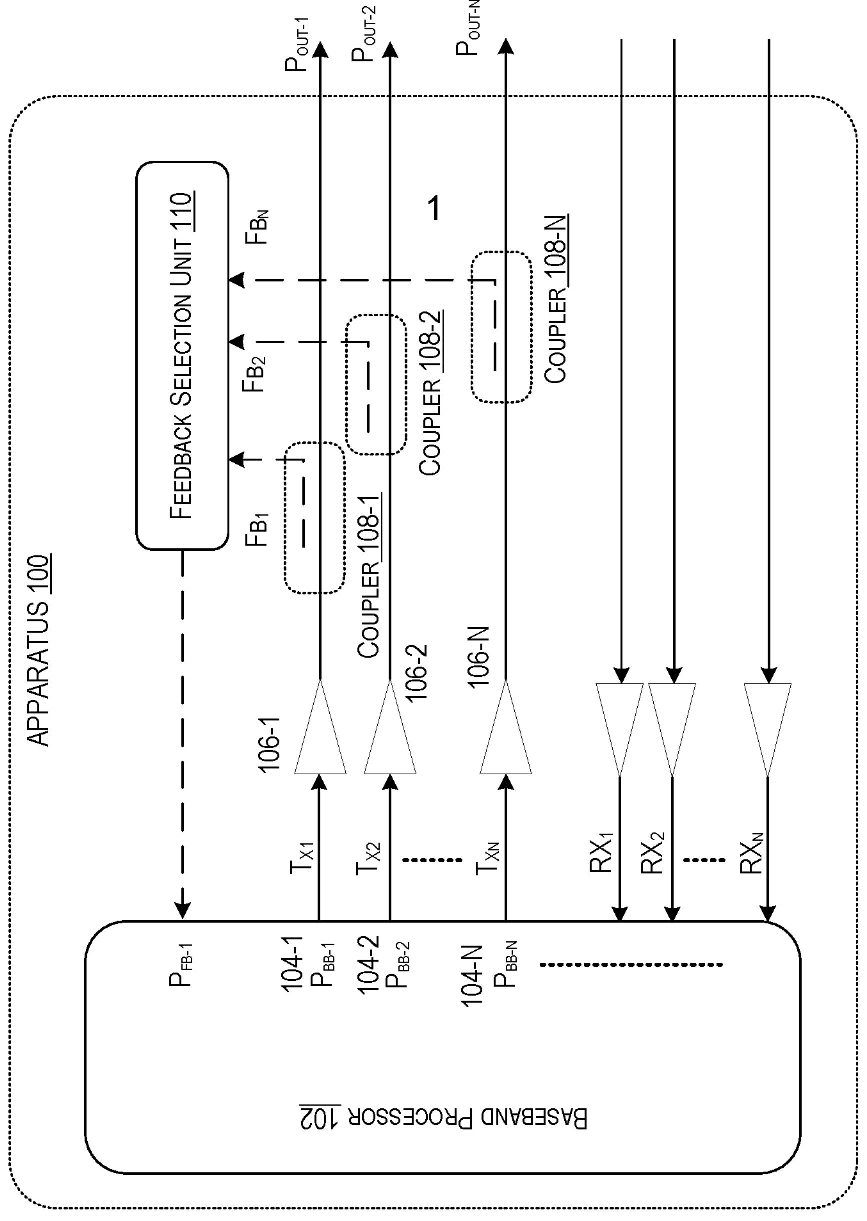
FIG. 1 illustrates an exemplary system architecture of an apparatus for managing radio frequency signal coupling, in accordance with an embodiment of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word “exemplary” and/or “demonstrative” is used herein to mean serving as an example, instance, or illustration. For the avoidance of doubt, the subject matter disclosed herein is not limited by such examples. In addition, any aspect or design described herein as “exemplary” and/or “demonstrative” is not necessarily to be construed as preferred or advantageous over other aspects or designs, nor is it meant to preclude equivalent exemplary structures and techniques known to those of ordinary skill in the art. Further, to the extent that the terms “includes,” “has,” “contains,” and other similar words are used in either the detailed description or the claims, such terms are intended to be inclusive in a manner similar to the term “comprising” as an open transition word without precluding any additional or other elements.

Reference throughout this specification to “one embodiment” or “an embodiment” or “an instance” or “one instance” means that a particular feature, structure, or characteristic described in connection with the embodiment is included in at least one embodiment of the present disclosure. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms “a,” “an,” and “the” are intended to include the plural forms as well, unless the context indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “module” or “engine” mentioned in this specification may refer to a program or an instruction that is stored in a memory and that can implement some functions. A “unit” mentioned in this specification may refer to a functional structure obtained through division based on logic. The “unit” may be implemented by only hardware, or implemented by a combination of software and hardware.

The term “a plurality of” mentioned in this specification means at least two. The term “and/or” describes an association relationship for describing associated objects and represents that three relationships may exist. For example, A and/or B may represent the following three cases: only A exists, both A and B exist, and only B exists. The character “/” generally indicates an “or” relationship between the associated objects.

The term “determining” and its variants may include calculating, extracting, generating, computing, processing, deriving, modelling, investigating, looking up (e.g., looking up in a table, a database, or another data structure), ascertaining, and the like. Also, “determining” may include receiving (e.g., receiving information), accessing (e.g., accessing data in a memory), and the like. Also, “determining” may include resolving, selecting, choosing, establishing, and the like.

The term “based on” does not mean “based only on,” unless expressly specified otherwise. In other words, the phrase “based on” describes both “based only on” and “based at least on.” The terms “connected,” “coupled,” and “communicatively coupled,” and related terms may refer to direct or indirect connections. If the specification states a component or feature “may,” “can,” “could,” or “might” be included or have a characteristic, that particular component or feature is not required to be included or have the characteristic.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

The present disclosure in general, relates to managing radio frequency signal coupling. In particular, the present disclosure relates to approaches for eliminating the impact of coupling on the performance of a multi-antenna transceiver system, for example, a fifth generation (5G) radio transceiver system, using baseband signal processing techniques. As would be appreciated, the approaches of the present subject matter may pre-process the signal for transmission, such that the coupling effect is nullified.

The manner in which the proposed system is used for managing radio frequency signal coupling is further explained in detail with respect to FIGS. 1-6. It is to be noted that drawings of the present subject matter shown here are for illustrative purposes only and are not to be construed as limiting the scope of the subject matter claimed. Further, FIGS. 1-4 have been explained together, and same reference numerals have been used to refer to identical components and entities.

FIG. 1 illustrates an exemplary system architecture of an apparatus for managing radio frequency signal coupling, in accordance with an embodiment of the present disclosure. In one example, the apparatus 100 may be implemented as or within a radio transceiver. The apparatus 100 may be used within any fifth generation (5G) device for facilitating the communication. Examples of such devices may include, but are not limited to, mobile phone, portable computer, a wearable device, or any other computing device. It may be noted that such examples are only illustrative, and the apparatus 100 may be implemented within any other device as well. All such examples would lie within the scope of the present subject matter.

Further, the apparatus 100 may be in communication with and coupled with other components of a communication network in which it may be implemented. Such other components have not been depicted here in FIG. 1 for the sake of brevity, and may be well understood by a person skilled in the art.

Continuing further, as depicted in FIG. 1, the apparatus 100 may include a baseband processor 102. The baseband processor 102 may include a plurality of transceiver chains 104-1, 104-2, . . . , 104-N (collectively and individually referred to as transceiver chain 104). In one example, the plurality of transceiver chains 104 may include a plurality of transmit chains. In another example, the plurality of transceiver chains 104 may include a plurality of receive chains. In yet another example, as depicted in FIG. 1, the plurality of transceiver chains 104 may include a plurality of transmit chains, as well as receive chains. All such examples would be covered within the scope of the present subject matter.

It may be further noted that, for the sake of clarity, the foregoing description would be explained with the respect to the transmit chains. However, it may be noted that this is only illustrative and exemplary, and the proposed approach of managing radio frequency signal coupling may be implemented to each of the plurality of receive chains as well. Such examples would also be covered within the scope of the present subject matter.

Returning to the present example, each of the plurality of transmit chains may include a power amplifier 106 and a coupler 108. As depicted in FIG. 1, each of the plurality of transmit chains, as well as receive chains, may include a respective power amplifier 106 and a respective coupler 108.

The power amplifier 106 may be communicatively coupled to the baseband processor 102. The power amplifier 106 may be configured to receive an input signal from the baseband processor 102, referred to as '$P_{BB}$' signal. The power amplifier 106 may amplify the input signal to generate an output signal having an output power. The coupler 108, connected to each of the plurality of transmit chains, may be configured to generate a feedback signal based on the output signal, referred to as 'FB' signal.

In an embodiment, the coupler 108 is located in the proximity of the output port or antenna port so that the generated feedback signal is most accurate representation of the RF coupling between the transmit channels.

As would be understood, as the signal travels from the baseband processor 102 output towards the antenna connector, signal coupling could happen between any pair of the conducting traces. Coupling between any combinations of the conducting traces could happen anywhere. To avoid missing the coupling point, a coupler to get feedback from each transmitter is added closer to the output port. Placing the coupler 108 closer to the output port ensure that the feedback represents the output signal as seen in the antenna port.

Continuing further, the apparatus 100 may further include a feedback selection unit 110 and one or more registers (not depicted in FIG. 1) in the baseband processor.

Figure 2:
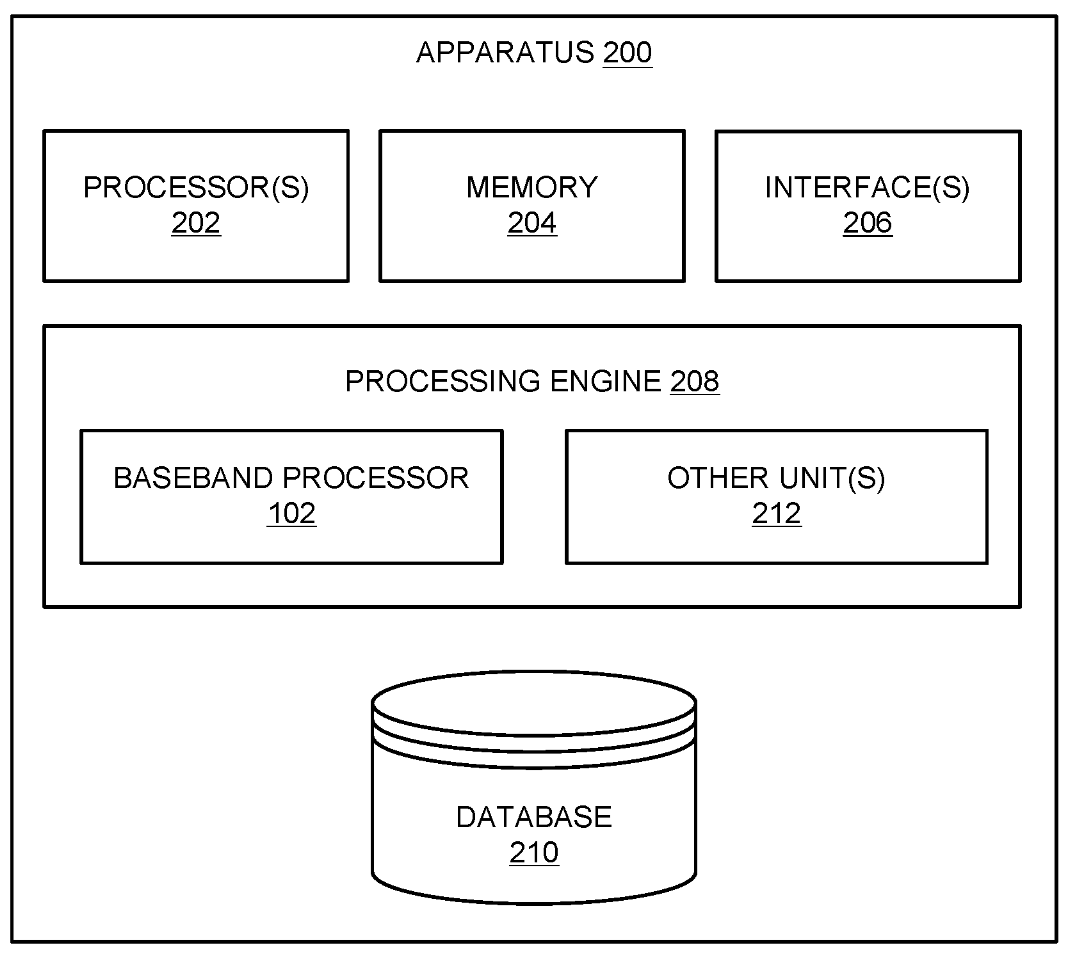
FIG. 2 illustrates an exemplary block diagram of a system for implementing the proposed mechanism, in accordance with an embodiment of the present disclosure.

The manner in which the apparatus 100 operates to manage radio frequency signal coupling is explained in further details in conjunction with FIG. 2. FIG. 2 illustrates a block diagram representing functional units of an apparatus 200 for managing radio frequency signal coupling, similar to the proposed apparatus 100.

As depicted in FIG. 2, the exemplary functional units of the apparatus 200 may include one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 may be configured to fetch and execute computer-readable instructions stored in a memory 204 of the system 200. The memory 204 may store one or more computer-readable instructions or routines, which may be fetched and executed to create or share the data units over a network service. The memory 204 may include any non-transitory storage device including, for example, volatile memory such as RAM, or non-volatile memory such as EPROM, flash memory, and the like.

In an embodiment, the apparatus 200 may also include an interface(s) 206. The interface(s) 206 may include a variety of interfaces, for example, interfaces for data input and output devices, referred to as I/O devices, storage devices, and the like. The interface(s) 206 may facilitate communication of the apparatus 200 with various devices coupled to the apparatus 100. The interface(s) 206 may also provide a communication pathway for one or more components of the apparatus 100. Examples of such components include, but are not limited to, processing engine(s) 208 and database 210.

In an embodiment, the processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor-executable instructions stored on a non-transitory machine-readable storage medium and the hardware for the processing engine(s) 208 may include a processing resource (for example, one or more processors), to execute such instructions.

In the present examples, the machine-readable storage medium may store instructions that, when executed by the processing resource, implement the processing engine(s) 208. In such examples, the apparatus 100 may include the machine-readable storage medium storing the instructions and the processing resource to execute the instructions, or the machine-readable storage medium may be separate but accessible to the apparatus 100 and the processing resource. In other examples, the processing engine(s) 208 may be implemented by electronic circuitry. In an embodiment, the database 210 may include data that is either stored or generated as a result of functionalities implemented by any of the components of the processing engine(s) 208. In an embodiment, the processing engine(s) 208 may include the baseband processor 102 and other unit(s) 212. The other unit(s) 212 may implement functionalities that supplement applications or functions performed by the system 102 and/or the processing engine(s) 208.

Continuing with the approaches of the working of the present subject matter, it may be again noted that although the foregoing description would be explained with respect to the transmit chains of the plurality of transceiver chains 104, the same may not be construed to limit the scope of the present subject matter. The proposed approaches for managing the radio frequency signal coupling may also be applied to the receive chains of the transceiver chains 104. Such examples would also lie within the scope of the present subject matter.

In operation, in each of the plurality of transmit chains of the transceiver chains 104, an input signal may be transmitted to the respective power amplifier 106. The power amplifier 106 may receive the input signal from the baseband processor 102, and may amplify the input signal to generate an output signal having an output power. Further, as described previously, the coupler 108 may generate a feedback signal based on the output signal.

Figure 3:
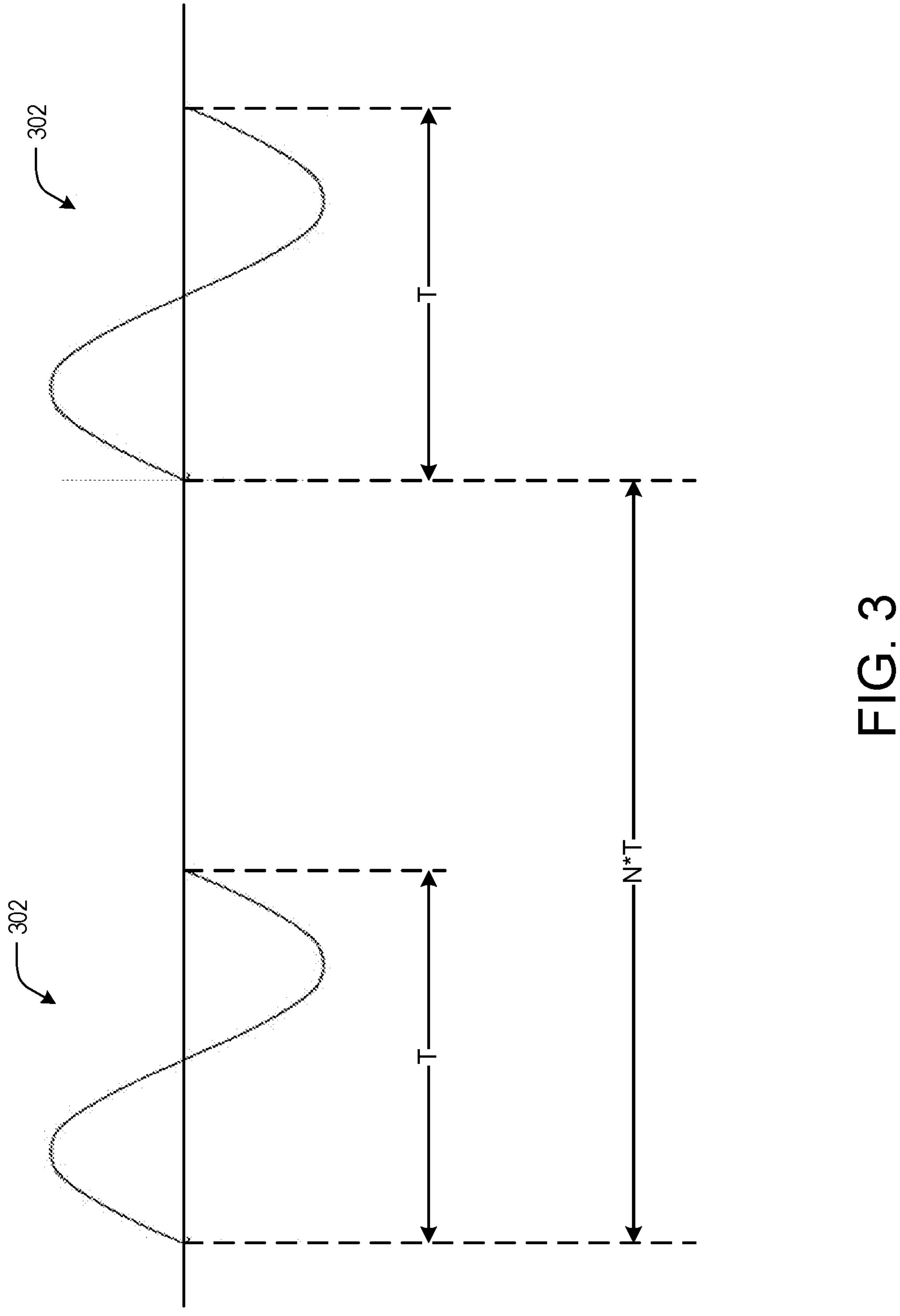
FIG. 3 depicts a waveform of an exemplary reference signal, as per an implementation of the present disclosure.
Figure 4A:
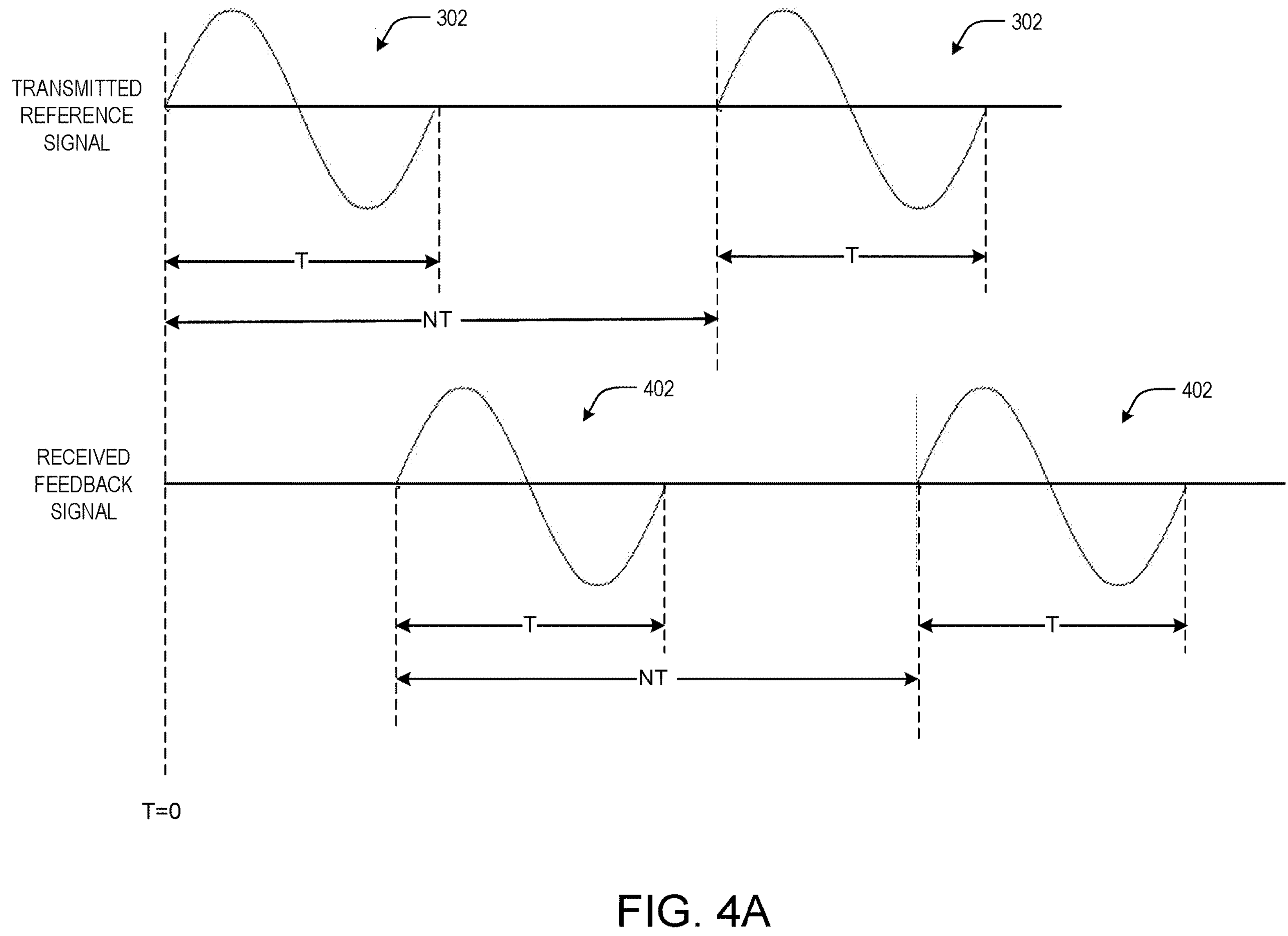
FIG. 4A depicts waveforms of transmitted reference signal and received feedback signal, as per an implementation of the present disclosure.

In one example, the baseband processor may be further configured to generate a reference signal with a predetermined amplitude (A) and a time period. The time interval periodicity of the reference signal is based at least on communication band utilized for transmission of the input signal and a length of the plurality of transmit chains. An exemplary method to generate a reference signal has been explained below, with reference to FIGS. 3-4. It may be further noted that the FIGS. 3, 4A, 4B, and 4C have been explained together, and same reference numerals have been used wherever necessary, FIG. 3 depicts a waveform of an exemplary reference signal, as per an implementation of the present subject matter. Further, FIG. 4A depicts waveforms of transmitter reference signal and feedback signal received at the coupler, as per an implementation of the present subject matter.

As depicted in FIG. 3, the reference signal 302 can be represented as $$S_{ref}(t) = A*\sin((2\pi/T)*t);\ \text{for } 0>=t<=T \\ =0;\ \text{for } T>t<=N*T \ ;$$

wherein A refers to the amplitude of the reference signal.

In an embodiment, the signal 302 may be repeated every N*T time period. As would be further understood, the amplitude of the reference signal 302 is "1" or unity. As the reference signal 302 traverses through the circuits in the transmit chain and the feedback path, the effective gain is set such that the feedback signal 402 is within the range of the signal detector for effectively decoding the feedback signal 402. Further, as the reference signal 302 has predetermined amplitude (e.g., A=1), it does not put/drive the one or more power amplifiers in the plurality of transmit chains in to the non-linearity region of operation.

In one exemplary approach, in 5G NR n78 band, the centre frequency may be taken as 3.55 Ghz. The time period T for the signal would be 0.28 ns. The wavelength of a signal traveling through a conducting trace (conducting part of the circuit or apparatus 100) is 53.4 mm. In time period T=0.28 ns, the signal will travel a distance of 53.4 mm. In 20T (e.g., N=20) period, the signal will travel 1068 mm. Since a typical radio transceiver board is much smaller in size than 1068 mm, the sine wave signal or feedback signal 402 as depicted in the feedback path (of the apparatus 100) will be within the 20*T time interval.

It may be noted that the aforementioned example was only illustrative, and in no manner may be construed to limit the scope of the present subject matter. Any other values of center frequency, time period or periodicity, and the wavelength of the reference signal 302 and the feedback signal 402 may also be considered without deviating from the scope of the present subject matter. Different waveforms may also be implemented for the reference signal 302 and the feedback signal 402 without departing from the scope of the ongoing description.

In another, the time interval, depicted as NT, may be adaptively identified based on the previously described calculation considering the transmission bands (5G NR bands) and the actual length of the conducting trace. For different 5G NR bands, the baseband processor 102 will identify appropriate time interval between the consecutive reference signals so that proper coverage and tracking of the feedback signal is achieved. In yet another example, all the timing related data may be identified for multiple supporting 5G NR bands and may be stored in the internal memory, such as memory 204, and based on the current band being used, the time interval of the reference signal and between consecutive reference signals is configured to identify the coupling coefficient.

As described previously, the reference signal waveform 302 ensures that a signal detector at the feedback path will be able to detect the feedback signal 402 within the N*T time interval. As an example, a signal peak detector would be able to find the peak of the signal in N*T interval. This may be measured, for example, in 10 measurement frames of duration NT each and an average of amplitude of the feedback signal 402 may be computed. This has been depicted in FIG. 4A.

In one example, the average amplitude of the feedback signal 402 may be considered as '$\alpha$'. The value of $\alpha$ may be used as a reference signal as seen in the feedback path. When the coupled signal is measured from rest of the plurality of transmit chains, a feedback signal 402 was obtained, with say, an amplitude of $\alpha_{ij}$; where j is the $T_x$ chain number where the signal was coupled from chain i. The ratio '$\alpha_{ij}/\alpha$' gives the coupling coefficient of this pair of chains.

In another example, the time period of the reference signal 302 and time interval between the consecutive reference signals can be identified based on the 5G NR band utilized for baseband signal transmission as well as the length of the transmit chains before the antenna port.

It may be noted that such aforementioned example was only illustrative, and may not be construed to limit the scope of the present subject matter in any manner.

Continuing further, in yet another example, the reference signal may be a periodic signal that is generated by the baseband processor 102. In such cases, the coupler 108 may be configured to generate the feedback signal based on the output signal within the determined periodicity of the reference signal.

Continuing further, based on the reference signal 302, the baseband processor 102 may be configured to identify, for each of the plurality of transmit chains, a set of coupling coefficients. In one example, identified coupling coefficients may be stored in the memory 204.

In one example, to determine the coupling coefficient for each of the plurality of transmit chains, the baseband processor 102 may select a first feedback signal in a given transmit chain and a second feedback signal in another transmit chain. In an exemplary embodiment, the another transmit chain may be the adjacent or next transmit chain with respect to the given transmit chain. It may be further noted that the use of terminology of given and another transmit chain is only illustrative, and the aforementioned approach may be implemented for each of the plurality of the transmit chains with respect to every other transmit chain. Further, the set of coupling coefficients may be identified at the another transmit chain while the given transmit chain transmits the input signal.

In another example, a feedback selection unit 110 may perform the aforementioned functionality of selecting the feedback signals.

An exemplary method has been provided below to identify the coupling coefficients. It may be noted that such method, as would be explained, is only exemplary, and may not be construed to limit the scope of the present subject matter in any manner.

As depicted in FIG. 1, the output power available at the antenna connector is $P_{out1}$, $P_{out2}$, $P_{outn}$ for transmit chains 1, 2 and n respectively. In a MIMO (Multiple Input Multiple Output) transceiver system, the power at the antenna connector is required to be at the same level. Therefore, it may be expected that $P_{1out}=P_{2out}=P_{nout}$.

Ideally, the gain of the power amplifier 106 for each of the transmit chains should be the same to produce the expected output power. However, in practical implementation, there would be trace losses and variation of insertion loss based on the tolerance of the components. Considering the effective gain of the transmit chain from the output of the baseband processor 102 to be $g_1$, $g_2$, $g_n$ for chain 1, 2, and n respectively, and further considering the output power level of the RF signal from the baseband processor 102 to be $Pbb_1$, $Pbb_2$, $P_{bbn}$, then $$P_{outk=}P_{bbk} * g_k;\text{ where } k = 1, 2, \ldots\ n$$

As would be understood, the modulated RF signal in a 5G NR sub-6 GHz band may operate in the C-Band RF frequency. In one example, considering n78 band, the centre frequency may be 3550 MHz. In such cases, at this frequency, the wavelength of the signal may be 84.45 mm [(2.9979×10^8)/(3.5×10^9 m)=84.45 mm]. In another example, in the case of a dielectric media, the wavelength of the signal may reduce by a factor of √|Er|, where Er is the dielectric constant of the PCB substrate. In yet another example, Teflon substrate with dielectric constant of 2.5 may be used. In such cases, the wavelength of the centre frequency of n78 band on the trace running on the substrate may be 84.45/√2.5 i.e., 53.4 mm.

In yet another example, when the signals are traveling through 2 different conducting traces (or 2 conducting paths or transmit chains) with a difference in their length equaling to 53.4 mm, there may be a phase difference between them by. In yet another example, in a multi antenna radio transmitter, it may be the case that the trace length traversed by each signal from the baseband processor 102 to the antenna port may be different. In yet another example, it may be the case that the signals may get coupled while they are at different phases. In yet another example, the baseband processor 102 may adaptively identify the phase difference between the different conducting traces for different bands for transmitting signal for example n28/n38/n40/n41/n77/n78/n79 etc.

It may be noted that all such examples are only illustrative, and may not be construed to limit the scope of the present subject matter in any manner.

Continuing further, a reference signal $S_{ref}$ (t) may be considered in an example embodiment. The power of such a reference signal at the output of the baseband processor 102 may be Pbb-k, where k is the port number. Considering that the gain of the analog circuits between the baseband output port to the antenna port has a flat gain $g_k$ within the operating frequency band, the signal at Antenna port k as y[k] and signal at baseband processor 102 output port as x[k] may be represented as:

$$y[k] = gk * x[k] + C,$$

wherein C is the coupled power from the rest of the signals traveling through the conducting traces.

Further, considering Cjk as the coupled signal at transmitter chain k while transmitter chain j is transmitting, then $$Y[j] = gj * x[j] + Cjk,$$

wherein Cjk, j!=k, represents coupled signal power from port j to port k; where j varies from 1 to n (except for j=k). When j=k, Cjk=Cjj=gj In one example, when only transmitter chain 1 is transmitting, the rest of the chains may receive coupled power from port 1 as C12, C13, . . . . C1n. In another example, when only transmitter chain 2 is transmitting, the coupled power will appear in chain 1, 3, . . . n. In yet another example, the gain of the overall chain may be represented as:

$$\begin{bmatrix} y_1 \\ y_2 \\ y_3 \end{bmatrix} = \begin{bmatrix} C11 & C21 & \ldots & Cn1 \\ C12 \ \vdots & \ddots & & \vdots \\ C1n & Cn2 & \ldots & Cnn \end{bmatrix} \begin{bmatrix} x_1 \\ x_2 \\ x_3 \end{bmatrix}$$

All the diagonal elements, C11, C22, Cnn may represent the gain of the overall chain. Hence C11=g1, C22=g2 and Cnn=gn In yet another example, the baseband processor 102 may compute the coupling coefficients based on the descried approach. The reference signal $S_{ref}$ (t) may be set as $x_1$. As would be understood, the signal power of $S_{ref}$ (t) may be set such that the desired power level at $P_{out-1}$ may be obtained. Thereafter, $F_{b1}$ in the feedback selection logic may be selected and the power value of $F_{b1}$ may be measured and stored in a register as $P_{fb-1}$ by the baseband processor.

In a similar manner, the next feedback path $F_{b2}$ in the feedback selection logic may be selected and the power value of $F_{b2}$ may be measured and stored in the register as $P_{fb-2}$.

Thereafter, coupled power at the transmit chain 2 received from port 1, while the transmit chain 1 is transmitting, may be computed. This may be referred as $C12=P_{fb-2}/P_{fb-1}$ In a similar manner, each of the next feedback paths in the feedback selection logic may be selected, and all the coupling coefficients for the coupling caused by the Tx1 chain may be computed. This process may then be repeated for each of the plurality of transmit chains.

In this manner, the set of coupling coefficients may be computed. However, it may be again noted that the above-mentioned steps are only exemplary, and may not be construed to limit the scope of the present subject matter in any manner, Continuing further, thereafter, the baseband processor 102 may determine a feedback power associated with each of the first feedback signal and the second feedback signal. The one or more registers in the baseband processor 102 may be configured to store a feedback power corresponding to each of the first feedback signal and the second feedback signal. The baseband processor 102 may also compute the feedback power of the feedback signal corresponding to each of the plurality of transmit chains. The coupling coefficient at the another transmit chain may be based on a ratio of the feedback power of the second feedback signal and the feedback power of the first feedback signal.

Thereafter, based on the identified set of coefficients, the baseband processor 202 may pre-process the input signal to generate a modified input signal. The modified input signal may then be caused to be transmitted via each of the plurality of transmit chains, such that the modified input signal nullifies a signal impairment due to radio frequency signal coupling between any two transmit chains in the plurality of transmit chains.

In one example, the baseband processor 102 may determine the modified input signal based on $$x_1' = x_1 - C21 * x2 - \ldots - Cn1 * xn,$$

wherein $x'_1$ is the modified input signal at the first transmit chain, $x_1$ is the input signal at the first transmit chain, C21 is the coupling coefficient at the first transmit chain while a second transmit chain of the plurality of transmit chains transmits the input signal, $x_2$ is the input signal at the second transmit chain, Cn1 is the coupling coefficient at the first transmit chain while an $n^{th}$ transmit chain of the plurality of transmit chains transmits the input signal, and $x_n$ is the input signal at the $n^{th}$ transmit chain, wherein n corresponds to a number of the plurality of transmit chains.

In yet another example, the baseband processor 102 may determine the modified input signal based on the following provided exemplary approach. The pre-processed signal may be identified based on the linear combination of the modified input signal for each of the RF chain, wherein each of the modified signal may be retrieved based on the multiplication of input signal with corresponding coupling coefficients (stored in the memory).

Considering, each chain is carrying unique signal x1=s1 (t), x2=s2(t) . . . xn=sn(t), then $$\begin{bmatrix} y_1 \\ y_2 \\ y_3 \end{bmatrix} = \begin{bmatrix} C11 & C21 & \ldots & Cn1 \\ C12 & \vdots & \ddots & \vdots \\ C1n & Cn2 & \ldots & Cnn \end{bmatrix} \begin{bmatrix} x_1 \\ x_2 \\ x_3 \end{bmatrix}$$

Ideally, y1=C11*x1=g1*x1. However, in practical implementation, y1=C11*x1+C21*x2+ . . . +Cn1*xn. Therefore, in order to cancel the undesired signals, the following operation in the baseband processor 102 was performed, and the modified signal may be fed at the output of the baseband signal processor 102. Considering proper matching of the load for each transmit chain, there will not be a case of reflected signal on a particular chain and hence the diagonal elements of the coefficient matrix are set to 1. Hence, all other coupling coefficients may be negated.

$$\begin{bmatrix} x_1' \\ x_2' \\ x_3' \end{bmatrix} = \begin{bmatrix} 1 & -C21 & \ldots & -Cn1 \\ -C12 & \vdots & \ddots & \vdots \\ -C1n & -Cn2 & \ldots & 1 \end{bmatrix} \begin{bmatrix} x_1 \\ x_2 \\ x_3 \end{bmatrix}$$

Therefore, $x'_1 = x_1 - C21*x2 - \ldots - Cn1*xn$.

Considering the coupling that happens before the signal goes to the power amplifier 106, as would be appreciated, the coupled signal may get nullified using the aforementioned exemplary method. Usually, the sections after the power amplifier 106 are properly isolated and hence the issue is prominent only till the power amplifier 106 input section. It may be again noted that the aforementioned example is only illustrative, and may not be construed to limit the scope of the present subject matter in any manner.

Figure 4B:
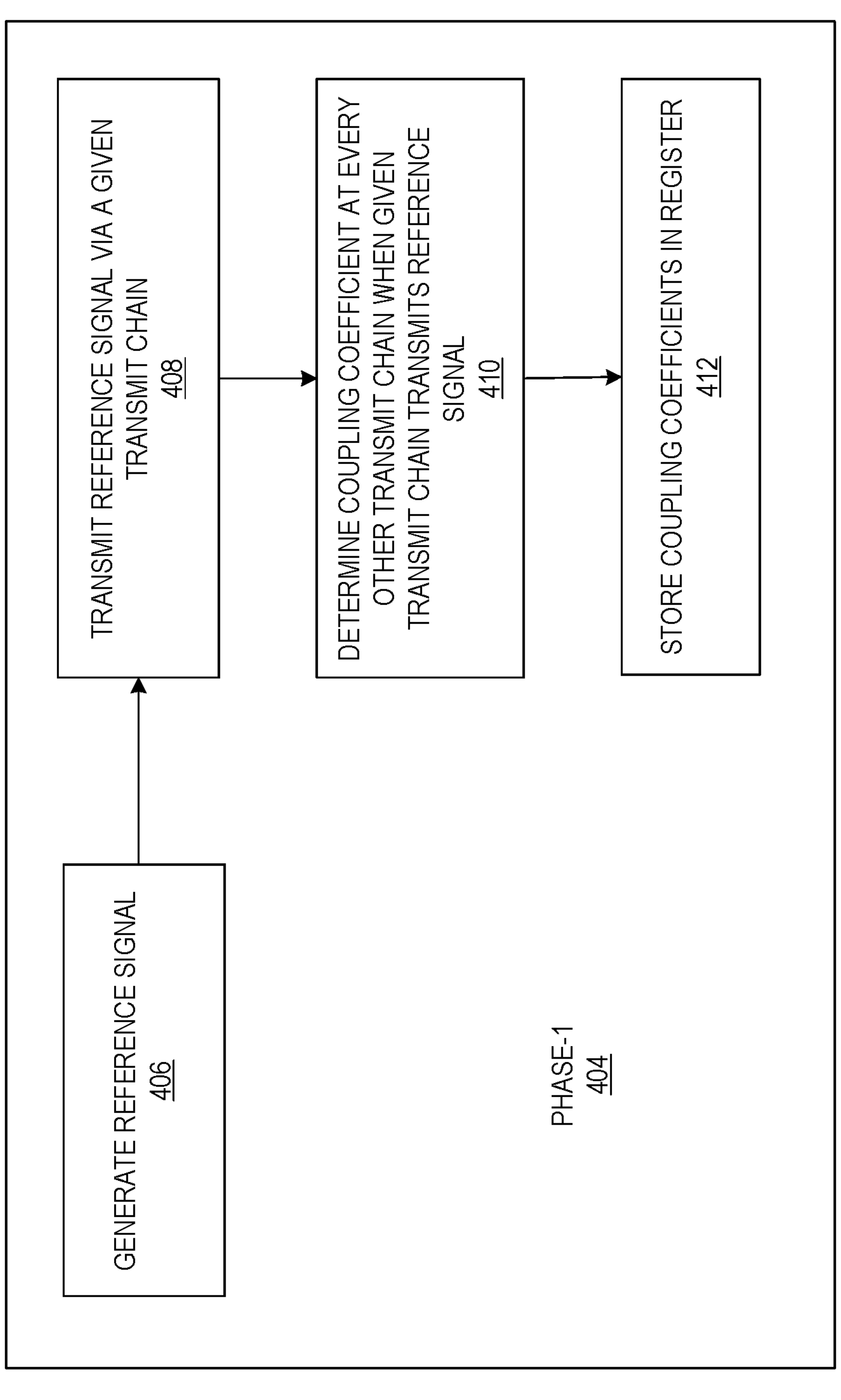
FIG. 4B depicts a method of determining coupling coefficients for each of plurality of transmit chains, in accordance with an embodiment of the present disclosure.
Figure 4C:
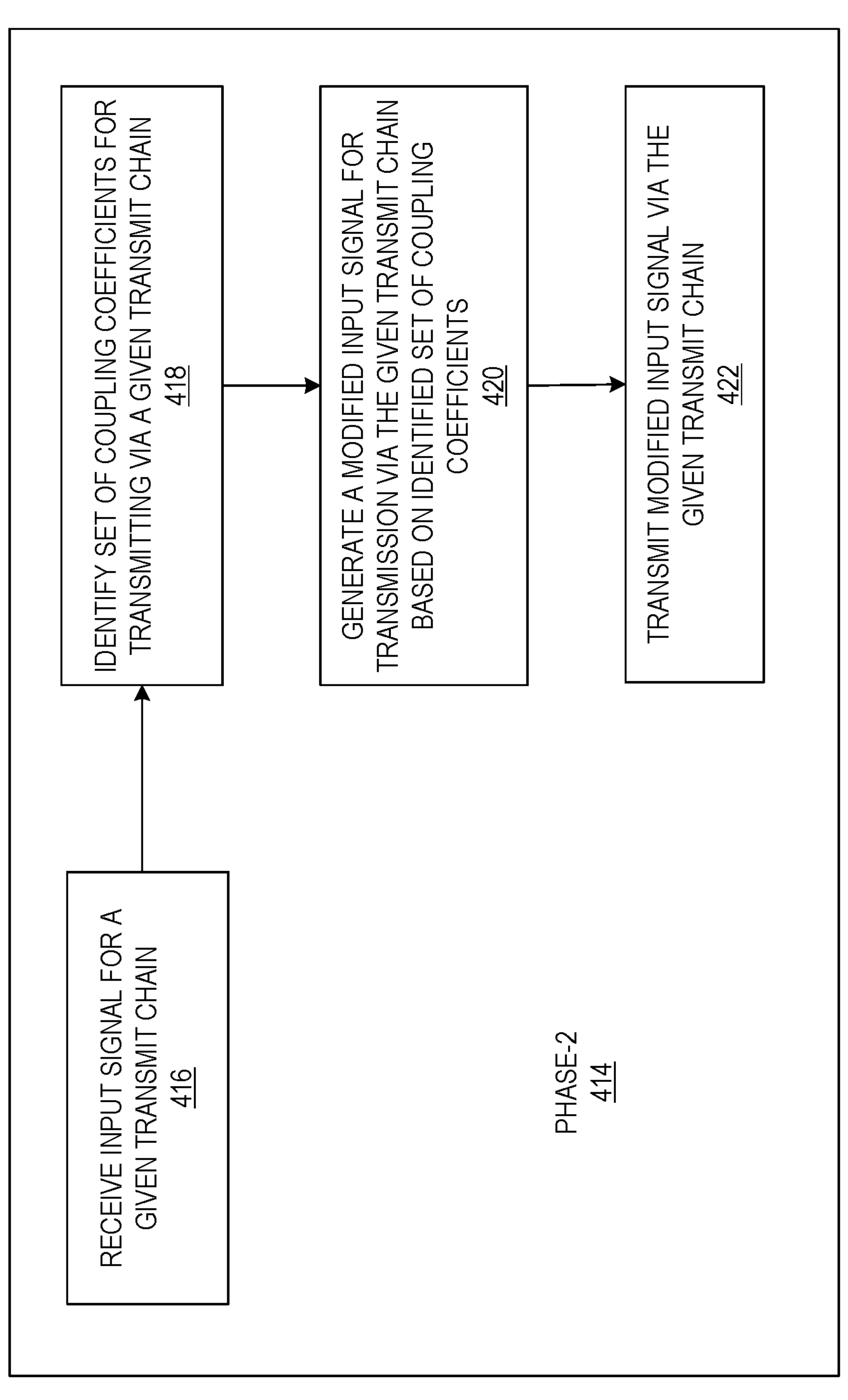
FIG. 4C depicts a method of generating a modified input signal, based on a set of coupling coefficients, for transmission via a given transmit channel, in accordance with an embodiment of the present disclosure.

The disclosed method of managing Radio Frequency signal coupling may be described as a 2-phase method. In an embodiment, the first phase can correspond to determination of a set of coupling coefficients for each of the plurality of transmit chains. The second phase can correspond to generation of a modified input signal, based on the set of coupling coefficients (identified in first phase), for transmission via a given transmit channel. FIG. 4B and FIG. 4C depict each of the two phases.

FIG. 4B depicts a method of determining coupling coefficients for each of plurality of transmit chains, in accordance with an embodiment of the present disclosure. As shown, phase-1 406 includes, at step 406, generating, by the baseband processor 102, a reference signal (e.g., 302) for transmission via a given transmit chain. Phase-1 406 includes, at step 408, transmitting, by the baseband processor 102, the reference signal via the given transmit chain. Next, the phase-1 406 includes, at step 410, determining, by the baseband processor 102, coupling coefficient at every other transmit chain when the given transmit chain transmits the reference signal. As may be understood, the step 410 will generate a plurality of coupling coefficients at every other transmit chain when the given transmit chain (say a $1^{st}$ transmit chain) transmits the reference signal 302. At step 412, at phase-1 406 includes, storing the set of coupling coefficients, thus generated, in one or more registers in the baseband processor 102.

The phase-1 406 of the method includes repeating the steps 408, 410, and 412 for each of the plurality of transmit chains. For example, the next iteration will involve transmitting the reference signal (e.g., 302) via the subsequent transmit chain or next transmit chain (say a $2^{nd}$ transmit chain) at step 408, generating the plurality of coupling coefficients at every other transmit chain when the subsequent transmit chain (the $2^{nd}$ transmit chain) transmits the reference signal 302. Accordingly, the reference signal will be transmitted via every transmit chain in further iterations and the corresponding set of coupling coefficients will be computed and stored in the register by the baseband processor.

FIG. 4C depicts a method of generating a modified input signal, based on a set of coupling coefficients, for transmission via a given transmit channel, in accordance with an embodiment of the present disclosure. As shown, FIG. 4C depicts phase-2 414 of the disclosed method that corresponds to generation of a modified input signal. In an embodiment, the phase-2 414 includes, at step 416, receiving, by the baseband processor 102, input signal for a given transmit chain (say the 1$^{st}$ transmit chain). The phase-2 414 includes, at step 418, identifying, by the baseband processor 102, the set of coupling coefficients for transmitting via a given transmit chain. As may be understood, the set of coupling coefficients for transmission via the given transmit chain was pre-determined in Phase-1 described above. Next, the phase-2 414 includes, at step 420, generating, by the baseband processor 102, a modified input signal for transmission via the given transmit chain based on identified set of coupling coefficients. Lastly, the phase-2 414 includes, at step 422, transmitting, by the baseband processor 102, the modified input signal via the given transmit chain.

It may be understood that the generation of set of coefficients in FIG. 4B is a sequential process and the set of coefficients are computed for each of the plurality of transmit chains in an iterative fashion. However, the generation of modified input signal for transmission via each of the plurality of transmit chains can be concurrently performed by the baseband signal in an embodiment. In yet another embodiment, the generation of modified input signal for transmission via each of the plurality of transmit chains may be as per the correspondingly received input signal for transmission.

Figure 5:
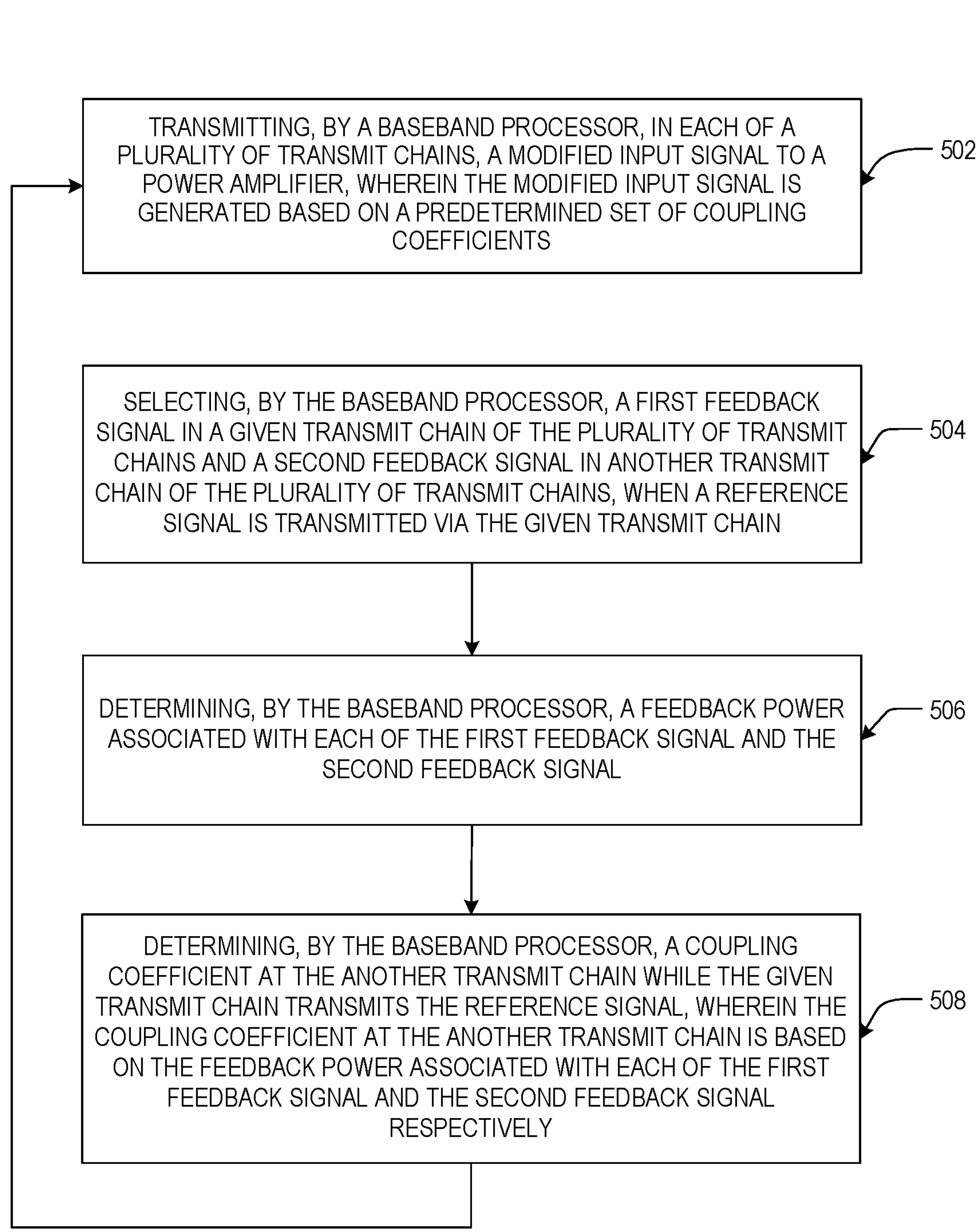
FIG. 5 illustrates an exemplary flow diagram representing steps of a method for managing radio frequency signal coupling, in accordance with an embodiment of the present disclosure.

FIG. 5 illustrates an exemplary flow diagram representing steps of a method 500 for managing radio frequency signal coupling, in accordance with an embodiment of the present disclosure. The method 500 may be implemented within the apparatus 100, as described in conjunction with FIGS. 1,2, 3, 4A, 4B, and 4C. In another example, the method 500 may be implemented within any other system, such as a radio transceiver.

At block 502, the method 500 may include transmitting, by a baseband processor, in each of a plurality of transmit chains, a modified input signal to a power amplifier. The modified input signal is generated based on a predetermined set of coupling coefficients. The method includes 500. At block 504, the method 500 includes selecting, by the baseband processor, a first feedback signal in a given transmit chain of the plurality of transmit chains and a second feedback signal in another transmit chain of the plurality of transmit chains, when a reference signal is transmitted via the given transmit chain. At step 506, the method includes determining, by the baseband processor, a feedback power associated with each of the first feedback signal and the second feedback signal. At step 508, the method includes determining, by the baseband processor, a coupling coefficient at the another transmit chain while the given transmit chain transmits the reference signal, wherein the coupling coefficient at the another transmit chain is based on the feedback power associated with each of the first feedback signal and the second feedback signal respectively.

It may be appreciated that the steps shown in FIG. 5 are merely illustrative. Other suitable steps may be used for the same, if desired. Moreover, the steps of the method 500 may be performed in any order and may include additional steps.

The methods and techniques described here may be implemented in digital electronic circuitry, field programmable gate array (FPGA), or with a programmable processor (for example, a special-purpose processor or a general-purpose processor such as a computer) firmware, software, or in combinations of them. Apparatus embodying these techniques may include appropriate input and output devices, FPGA, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system, explained in detail with reference to FIG. 6, including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, and flash memory devices; magnetic disks such as internal hard disks and removable disks; and magneto-optical disks. Any of the foregoing may be supplemented by, or incorporated in, specially designed application-specific integrated circuits (ASICs).

Figure 6:
FIG. 6 illustrates an exemplary computer system in which or with which the proposed mechanism may be implemented, in accordance with an embodiment of the present disclosure.
Figure 6:
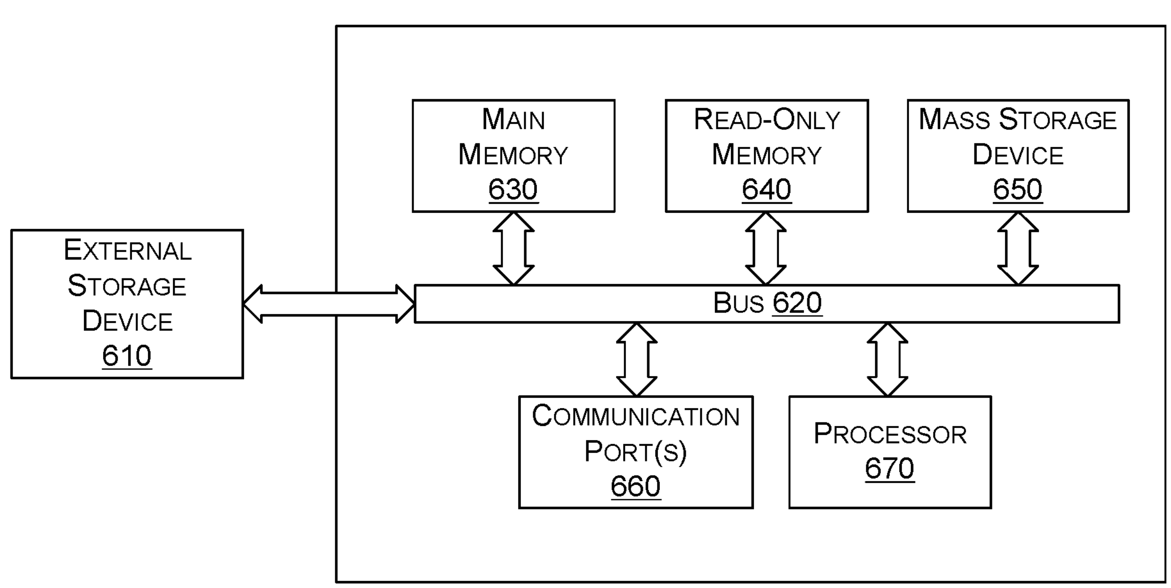

In particular, FIG. 6 illustrates an exemplary computer system 600 in which or with which embodiments of the present disclosure may be utilized. The computing system 600 may be implemented as or within the apparatus 100 and/or any other suitable device described in accordance with embodiments of the present disclosure. As depicted in FIG. 6, the computer system 600 may include an external storage device 610, a bus 620, a main memory 630, a read-only memory 640, a mass storage device 650, communication port(s) 660, and a processor 670. A person skilled in the art will appreciate that the computer system 600 may include more than one processor 670 and communication ports 660. The processor 670 may include various modules associated with embodiments of the present disclosure. The communication port(s) 660 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 660 may be chosen depending on a network, such a Local Area Network (LAN), Wide Area Network (WAN), or any network to which the computer system 600 connects.

In an embodiment, the main memory 630 may be Random Access Memory (RAM), or any other dynamic storage device commonly known in the art. The read-only memory 640 may be any static storage device(s) e.g., but not limited to, a Programmable Read Only Memory (PROM) chips for storing static information e.g., start-up or basic input output system (BIOS) instructions for the processor 670. The mass storage device 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus 620 communicatively couples the processor 670 with the other memory, storage, and communication blocks. The bus 620 may be, e.g. a Peripheral Component Interconnect PCI)/PCI Extended (PCI-X) bus, Small Computer System Interface (SCSI), USB, or the like, for connecting expansion cards, drives, and other subsystems as well as other buses, such a front side bus (FSB), which connects the processor 670 to the computer system 600.

In another embodiment, operator and administrative interfaces, e.g. a display, keyboard, and a cursor control device, may also be coupled to the bus 620 to support direct operator interaction with the computer system 600. Other operator and administrative interfaces may be provided through network connections connected through the communication port(s) 660. Components described above are meant only to exemplify various possibilities. In no way should the aforementioned exemplary computer system 600 limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

It is an advantage of the present disclosure to provide an efficient solution for managing radio frequency signal coupling in a fifth generation (5G) transceiver.

It is another advantage of the present disclosure to nullify signal coupling effect while transmitting input signal via a plurality of transmit chains from a baseband processor in a transceiver.

I claim:

1. An apparatus for managing radio frequency signal coupling, comprising:

a baseband processor comprising a plurality of transceiver chains, wherein the plurality of transceiver chains comprises a plurality of transmit chains, and wherein each of the plurality of transmit chains comprises:

a power amplifier communicatively coupled to the baseband processor, wherein the power amplifier is configured to:

receive a modified input signal from the baseband processor; and amplify the modified input signal to generate an output signal having an output power, wherein the modified input signal is generated based on a predetermined set of coupling coefficients;

wherein the baseband processor is configured to:

generate a reference signal with a periodicity based at least on communication band utilized for transmission of an input signal and a length of the plurality of transmit chains;

based on the reference signal and at least one feedback signal, compute the predetermined set of coupling coefficients for each of the plurality of transmit chains; and based on the determined set of coupling coefficients, pre-process the input signal to generate the modified input signal to be transmitted via each of the plurality of transmit chains such that the modified input signal nullifies a signal impairment due to radio frequency signal coupling between any two transmit chains in the plurality of transmit chains.

2. The apparatus as claimed in claim 1, comprising a coupler configured to generate the at least one feedback signal based on the reference signal.

3. The apparatus as claimed in claim 2, comprising:

a feedback selection unit configured to select, based on the reference signal, a first feedback signal corresponding to a given transmit chain and a second feedback signal corresponding to at least one other transmit chain of the plurality of transmit chains; and one or more registers in the baseband processor configured to store a feedback power corresponding to each of the first feedback signal and the second feedback signal, wherein the baseband processor is configured to compute the feedback power of the feedback signal corresponding to each of the plurality of transmit chains.

4. The apparatus as claimed in claim 3, wherein the baseband processor is configured to determine a coupling coefficient at the at least one other transmit chain while the given transmit chain transmits the reference signal, and wherein the coupling coefficient at the at least one other transmit chain is determined based on a ratio of the feedback power of the second feedback signal and the feedback power of the first feedback signal.

5. The apparatus as claimed in claim 1, wherein the reference signal has a predetermined periodicity.

6. The apparatus as claimed in claim 1, wherein the modified input signal is based on the computed predetermined set of coupling coefficients for each of the plurality of transmit chains.

7. The apparatus as claimed in claim 1, wherein the modified input signal is generated based on:

$$x_1' = x_1 - C21 * x2 - \ldots - Cn1 * xn,$$

wherein $x'_1$ is the modified input signal at a given transmit chain, $x_1$ is the input signal at the given transmit chain, C21 is a coupling coefficient at the given transmit chain while at least one other transmit chain transmits the input signal, $x_2$ is the input signal at the at least one other transmit chain, Cn1 is a coupling coefficient at the given transmit chain while an $n^{th}$ transmit chain of the plurality of transmit chains transmits the input signal, and $x_n$ is the input signal at the $n^{th}$ transmit chain, wherein n corresponds to a number of the plurality of transmit chains.

8. The apparatus as claimed in claim 1, wherein the plurality of transceiver chains comprises a plurality of receive chains, and wherein the baseband processor is configured to nullify the signal impairment due to radio frequency signal coupling between any two receive chains in the plurality of receive chains.

9. A method for managing radio frequency signal coupling, comprising:

transmitting, by a baseband processor, in each of a plurality of transmit chains, a modified input signal to a power amplifier, wherein the modified input signal is generated based on a predetermined set of coupling coefficients, wherein the predetermined set of coupling coefficients are computed, for each of the plurality of transmit chains, by:

selecting, by the baseband processor, a first feedback signal in a given transmit chain of the plurality of transmit chains and a second feedback signal in another transmit chain of the plurality of transmit chains, when a reference signal is transmitted via the given transmit chain;

determining, by the baseband processor, a feedback power associated with each of the first feedback signal and the second feedback signal; and determining, by the baseband processor, a coupling coefficient at the another transmit chain while the given transmit chain transmits the reference signal, wherein the coupling coefficient at the another transmit chain is based on the feedback power associated with each of the first feedback signal and the second feedback signal, respectively.

10. The method as claimed in claim 9, wherein the coupling coefficient at the another transmit chain corresponds to a ratio of the feedback power associated with the second feedback signal and the feedback power associated with the first feedback signal.

11. The method as claimed in claim 9, wherein the another transmit chain corresponds to an adjacent transmit chain with respect to the given transmit chain.

12. The method as claimed in claim 9, comprising generating, by the baseband processor, for each of the plurality of transmit chains, the modified input signal based on the respectively determined set of coupling coefficients to nullify a coupling signal corresponding to the coupling coefficient of the each of the plurality of transmit chains.

13. The method as claimed in claim 9, wherein the reference signal is generated with a periodicity based at least on communication band utilized for transmission of an input signal and a length of the plurality of transmit chains.

14. The method as claimed in claim 9, wherein the reference signal has a predetermined periodicity.

15. The method as claimed in claim 9, wherein the modified input signal is generated based on:

$$x_1' = x_1 - C21 * x2 - \ldots - Cn1 * xn,$$

wherein $x'_1$ is the modified input signal at the given transmit chain, $x_1$ is an input signal at the given transmit chain, C21 is a coupling coefficient at the given transmit chain while at least one other transmit chain transmits the input signal, $x_2$ is the input signal at the at least one other transmit chain, Cn1 is a coupling coefficient at the given transmit chain while an $n^{th}$ transmit chain of the plurality of transmit chains transmits the input signal, and $x_n$ is the input signal at the $n^{th}$ transmit chain, wherein n corresponds to a number of the plurality of transmit chains.

16. A system for managing radio frequency signal coupling, comprising:

a processor; and a memory coupled to the processor, wherein the memory comprises processor-executable instructions that when executed by the processor causes the processor to:

for each of the plurality of transmit chains:

select a first feedback signal in a given transmit chain of the plurality of transmit chains and a second feedback signal in another transmit chain of the plurality of transmit chains based on a reference signal;

determine a feedback power associated with each of the first feedback signal and the second feedback signal;

determine a coupling coefficient at the another transmit chain while the first transmit chain transmits the reference signal, wherein the coupling coefficient at the another transmit chain is based on the feedback power associated with each of the first feedback signal and the second feedback signal;

identify a set of coupling coefficients for transmission of an input signal via each of the plurality of transmit chains; and generate a modified input signal to be transmitted via each of the plurality of transmit chains based on the identified set of coupling coefficients to nullify a coupling signal in each of the plurality of transmit chains, wherein the coupling signal represents a signal impairment due to radio frequency signal coupling between any two transmit chains in the plurality of transmit chains.

17. The system as claimed in claim 16, wherein the coupling coefficient at the another transmit chain corresponds to a ratio of the feedback power associated with the second feedback signal and the feedback power associated with the first feedback signal.

18. The system as claimed in claim 16, wherein the another transmit chain corresponds to an adjacent transmit chain with respect to the given transmit chain.

19. The system as claimed in claim 16, wherein the reference signal is generated with a periodicity based at least on communication band utilized for transmission of the input signal and a length of the plurality of transmit chains, and wherein the reference signal has a predetermined periodicity.

* * * * *